United States Patent [19]

Iwamura

[11] Patent Number: 5,400,076

[45] Date of Patent: Mar. 21, 1995

[54] COMPRESSED MOTION PICTURE SIGNAL EXPANDER WITH ERROR CONCEALMENT

[75] Inventor: Ryuichi Iwamura, Tokyo, Japan

[73] Assignee: Sony Corporation, Japan

[21] Appl. No.: 981,246

[22] Filed: Nov. 25, 1992
(Under 37 CFR 1.47)

[30] Foreign Application Priority Data

Nov. 30, 1991 [JP] Japan .................. 3-342413
Nov. 30, 1991 [JP] Japan .................. 3-342435

[51] Int. Cl.$^6$ .......................................... H04N 7/137
[52] U.S. Cl. .................................. 348/416; 348/413
[58] Field of Search .................... 358/136; 371/31; H04N 7/137; 348/411, 413, 416, 420

[56] References Cited

U.S. PATENT DOCUMENTS

| | | | |
|---|---|---|---|
| 4,684,984 | 8/1987 | Hirano | 358/136 |
| 4,958,226 | 9/1990 | Haskell et al. | 358/136 |
| 5,057,921 | 10/1991 | Robert et al. | 358/136 |
| 5,068,724 | 11/1991 | Krause et al. | 358/136 |
| 5,089,889 | 2/1992 | Sugiyama | 358/136 |
| 5,122,876 | 6/1992 | Aoki | 348/411 |
| 5,128,756 | 7/1992 | Johnston et al. | 358/136 |
| 5,144,427 | 9/1992 | Kitaura et al. | 358/136 |
| 5,150,210 | 9/1992 | Hoshi et al. | 358/136 |
| 5,166,958 | 11/1992 | Shimokoriyama et al. | 348/411 |
| 5,226,093 | 7/1993 | Iwase | 348/416 |
| 5,243,428 | 9/1993 | Challapali et al. | 371/31 |

FOREIGN PATENT DOCUMENTS

0402058A2 12/1990 European Pat. Off.
0430027A2 6/1991 European Pat. Off.
WO91/17629 11/1991 WIPO.

OTHER PUBLICATIONS

Signal Processing: Image Communication, vol. 2, No. 2, Aug. 1990, Amsterdam, NL; pp. 127-144, XP243473, Puri et al.: "Video coding with motion-compensated interpolation for CD-ROM applications".

IEEE Journal On Selected Areas In Communication, vol. 7, No. 5, Jun. 1989, New York, USA, pp. 807-814, XP36749, M. Wada: "Selective recovery of video packet loss using error concealment".

Primary Examiner—Howard W. Britton
Assistant Examiner—Richard Lee
Attorney, Agent or Firm—Limbach & Limbach; Ian Hardcastle

[57] ABSTRACT

In a compressed motion picture signal expander, if the compressed motion picture signal includes an uncorrectable signal error, the resulting defective picture block can be replaced by a replacement picture block that blends in smoothly with the picture blocks surrounding it. Hence the picture error resulting from the uncorrectable signal error is concealed. The defective picture block resulting from a signal portion including an uncorrectable signal error is replaced by a replacement block produced by prediction from a past picture using the motion of the past picture. In this manner, the defective picture block can be replaced by the replacement picture block that blends smoothly with the surrounding picture blocks regardless of the existence of motion in the picture. When an uncorrectable signal error is detected, the expander determines whether or not the motion quantity represented by the motion vector of the picture block of the past picture corresponding to the defective picture block is larger than a predetermined value. If the motion quantity is large, the replacement picture block is generated by intra-picture interpolation, using the pixel values of the boundary pixels in the picture blocks surrounding the defective picture block. If the motion quantity is small, the replacement picture block produced by prediction block is used. In this manner, the error resulting from the uncorrectable signal can be concealed and rendered unnoticeable, regardless of the motion quantity represented by the compressed motion picture signal.

10 Claims, 8 Drawing Sheets

COMPRESSED MOTION PICTURE SIGNAL EXPANDER WITH ERROR CONCEALMENT

BACKGROUND OF THE INVENTION

1. Field of the Invention

This invention relates to an apparatus for expanding a compressed motion picture signal reproduced from a recording media such as a compact disc, cassette tape, and optical disc etc.

2. Description of the Prior Art

Conventionally, since recording a motion picture signal requires that an extremely large amount of information be recorded, a recording medium capable of an extremely high rate of recording and reproduction is required. For example, to record and reproduce an NTSC-standard video signal requires the use of a conventional video disc having a very large information recording capacity. If it is desired to record the motion picture signal on a smaller recording medium having a smaller recording capacity, and to provide a recording time comparable with that of a conventional video disc, the motion picture signal must be compressed using a form of high-efficiency compression prior to recording. Additionally, means for efficiently expanding the compressed motion picture signal must also be provided.

In order to comply with these demands, various high-efficiency systems for compressing motion picture signals have been proposed. One of these systems is known as the MPEG (Moving Picture Experts Group) system.

In the MPEG system, differences between pictures of the motion picture signal are determined to reduce redundancy in the time domain. These differences are then subject to a discrete cosine transform (DCT) to reduce the redundancy in the spatial domain. However, in the MPEG system, the decoder is disposed at an upstream position in the decoding stage. Therefore, if the compressed motion picture signal includes an error which cannot be corrected by the error correcting ability of the decoder, the resulting motion picture output signal lacks a portion corresponding to the erroneous part of the compressed signal. If no error concealment processing is applied to the motion picture output signal, the missing signal portion impairs the quality of the picture displayed in response to the motion picture output signal.

Accordingly, an uncorrectable error in the compressed motion picture signal is conventionally concealed by fitting part of a past picture in place of the missing portion of the current picture. This method is effective when there is no motion in the missing portion in the current picture relative to the past picture. However, the missing portion and portions of the picture surrounding the missing portion will not connect smoothly if there is motion between the current picture and the past picture. Therefore, the picture error resulting from the error in the compressed motion picture signal will still be noticeable, and an acceptable result will not always be obtained.

OBJECTS AND SUMMARY OF THE INVENTION

In view of the foregoing, an object of this invention is to provide an apparatus for expanding a compressed motion picture signal which can provide an improved fidelity in the reproduced picture when the reproduced compressed motion picture signal includes an uncorrectable signal error.

Another object of the invention is to provide an apparatus for expanding a compressed motion picture signal which can expand the compressed motion picture signal in a manner that renders missing portions of the picture resulting from uncorrectable signal errors unnoticeable, regardless of the motion of the missing portion.

The foregoing objects and other objects of the invention have been achieved by the provision of a compressed motion picture signal expander for expanding a compressed motion picture signal to provide a motion picture output signal. The compressed motion picture signal comprises a sequence of signal portions. Each signal portion represents part of a picture and includes a motion vector. The apparatus comprises an error corrector and a decoder. The error corrector corrects errors in the compressed motion picture signal, and supplies an error detection signal when an uncorrectable error is detected in a signal portion. The decoder decodes each signal portion of the compressed motion picture signal using a previously-decoded picture and the motion vector of the signal portion to provide a portion of the motion picture output signal. The decoder also provides a portion of the motion picture output signal using the previously-decoded picture and a previous motion vector used by the decoding means to decode the previously-decoded picture when the error detection signal indicates an uncorrectable error is detected in a signal portion.

The invention also provides a compressed motion picture signal expander for expanding a compressed motion picture signal to provide a motion picture output signal. The compressed motion picture signal comprises a sequence of signal portions. Each signal portion represents part of a picture and includes a motion vector. The apparatus comprises a error corrector and a decoder. The error corrector means corrects errors in the compressed motion picture signal, and supplies an error detection signal when an uncorrectable error is detected in a signal portion. The decoder for decodes each signal portion of the compressed motion picture signal using a previously-decoded picture and the motion vector of the signal portion to provide a portion of the motion picture output signal. The decoding means also provides either a predictive picture signal or an interpolated picture signal as the portion of the motion picture output signal when the error detection signal indicates an uncorrectable error is detected in a signal portion.

In expanding the compressed motion picture signal, when an uncorrectable error is detected, the defective portion of the picture is replaced with a predictive picture signal which is produced using a previously-decoded picture and a motion vector used to decode the previously-decoded picture. In this manner, the defective picture information resulting from the uncorrectable error can be concealed in a way that is unnoticeable, even if the amount of motion represented by the signal portion including the uncorrectable error.

Further, the replacement picture may be obtained using either intra-picture interpolated picture data or predictive picture data, depending on the amount of motion indicated by the motion vector of the block located in the previously-decoded picture at the position of the defective picture block in the current picture. In this way, the defective picture information due to the uncorrectable error can be concealed so as to be unnoticeable, regardless of the amount of motion of represented by the portion of the compressed motion picture signal in which the uncorrectable error is detected.

According to the invention, the defective picture block derived from the portion of the compressed motion picture signal in which the uncorrectable error signal is detected is replaced by a picture block obtained by performing motion compensation on a previously-decoded picture using the motion vector for the block located in the previously-decoded picture at the position of the defective picture block in the current picture. In this manner, regardless of the amount of the motion represented by the signal portion in which the uncorrectable error is detected, the defective portion of the picture resulting from the uncorrectable error can be replaced by a picture portion that connects smoothly to the surrounding portions of the picture.

According to the invention, when an uncorrectable error is detected, the predictive picture signal is substituted for the defective picture block, or a picture block obtained by interpolation using the boundary pixels of the blocks surrounding the defective picture block is substituted for the defective picture block. Thereby, regardless of the amount of motion represented by the signal portion in which the uncorrectable error is detected, the defective portion of the picture resulting from the uncorrectable error can be replaced by a picture portion that connects smoothly to the surrounding portions of the picture.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
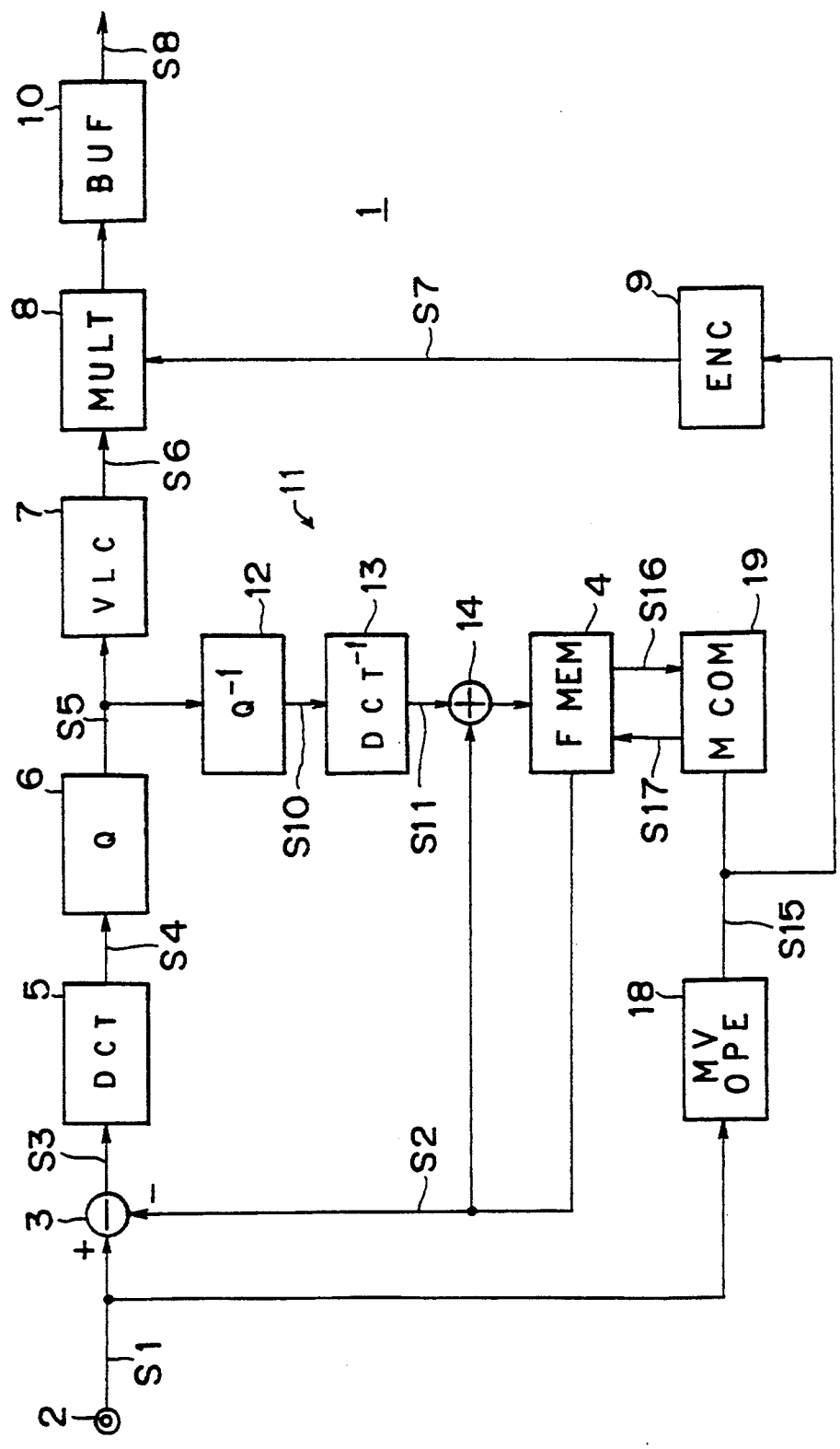
FIG. 1 is a block diagram showing the construction of an embodiment of an apparatus for compressing a motion picture signal to provide a compressed motion picture signal for expansion by the compressed motion signal expander according to the invention.

Preferred embodiments of the invention will be described with reference to the accompanying drawings:

In FIG. 1, 1 generally indicates the apparatus for compressing a motion picture signal. The apparatus receives the picture input signal S1 via the input terminal 2. The motion picture input signal S1 is formed by convening an analog motion picture signal read out from a recording medium, such as an optical disc etc., into a digital signal.

Figure 2:
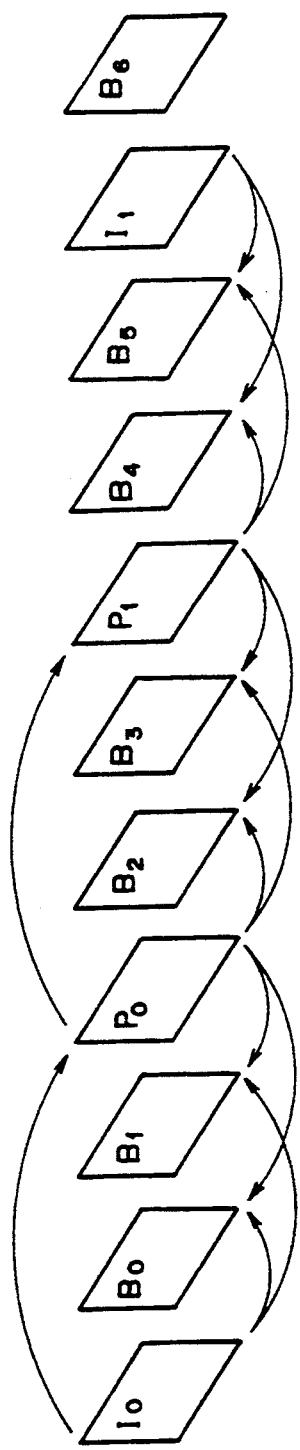
FIG. 2 is a schematic diagram showing inter-frame motion prediction.

The apparatus 1 compresses the motion picture input signal S1 to provide intra-picture coded pictures (I-pictures) I, forward prediction-coded pictures (P-pictures) P, and bidirectional prediction-coded pictures (B-pictures) B, as shown in FIG. 2.

The I-pictures (I0, I1, . . . ) are pictures that are subject to compression independently of other pictures. The forward prediction-coded P-pictures (P0, P1, . . . ) are pictures to which motion prediction is applied in one direction, i.e., the forward direction, and the bidirectional prediction-coded B-pictures (B0, B1, . . . ) are pictures to which motion prediction is applied in both forward and reverse directions.

The subtractor 3 receives blocks of the motion picture input signal S1 via the input terminal 2, and also receives from the frame memory 4 blocks of a reference picture signal S2 of a previous picture stored in the frame memory 4. The subtractor 3 generates a block of differences between each block of the motion picture input signal S1 and the corresponding block of the reference picture signal S2, which it supplies to the discrete cosine transform circuit 5.

The discrete cosine transform circuit 5 takes advantage of the two-dimensional correlation of the pictures constituting the motion picture by applying a discrete cosine transform of each block of differences S3, and supplies the resulting transform coefficients S4 to the quantizer 6.

The quantizer 6 quantizes the transform coefficients S4 using a predetermined quantizing step size, and supplies the resulting quantized transform coefficients S5 to the variable-length coder 7.

The variable length coder 7 applies variable-length coding to the quantized transform coefficients S5 and supplies the resulting coded transform coefficients S6 to the multiplexer 8.

The multiplexer 8 multiplexes a motion vector S7 for each block, supplied by the encoder 9, with a picture signal component including the coded transform coefficients S6, and supplies the resulting multiplexed signal to the output buffer 10. The multiplexed signal is then read out of the output buffer 10 as the compressed motion picture signal S8.

The motion picture signal compressor 1 also includes the local decoder 11, which carries out local decoding of the quantized transform coefficients S5 included in the compressed motion picture signal S8, and supplies the resulting reconstructed pictures to the frame memory 4.

In the local decoder 11, the inverse quantizer 12 carries out inverse quantizing of the quantized transform coefficients S5, and the inverse discrete cosine transform circuit 13 applies an inverse discrete cosine transform to the resulting transform coefficients S10. The resulting recovered difference block S11 is supplied to the adder 14.

The adder 14 adds the block of the reference picture signal S2, which is fed back from the frame memory 4, to the recovered difference block S11 to provide a reconstructed picture block, which is then stored in the frame memory 4 as a block of a new reconstructed picture corresponding to the current picture. The new reconstructed picture, when complete, will serve as a reference picture for compressing other pictures of the motion picture signal.

The motion picture signal compressor 1 obtains the motion vector for each block of the motion picture input signal S1 by supplying the motion picture input signal S1 to the motion vector operation circuit 18, and supplying the resulting motion vector as motion data S15 to the motion compensation circuit 19 and the encoder 9.

The motion compensation circuit 19 reads reference pictures S16 from the frame memory 4, and supplies motion prediction data S17, which performs motion compensation on the reference pictures S16, to the frame memory 4.

The encoder 9 encodes the motion data S15, which is obtained by the motion vector operation circuit 18, to provide the motion vector S7 supplied to the multiplexer 8.

Figure 3:
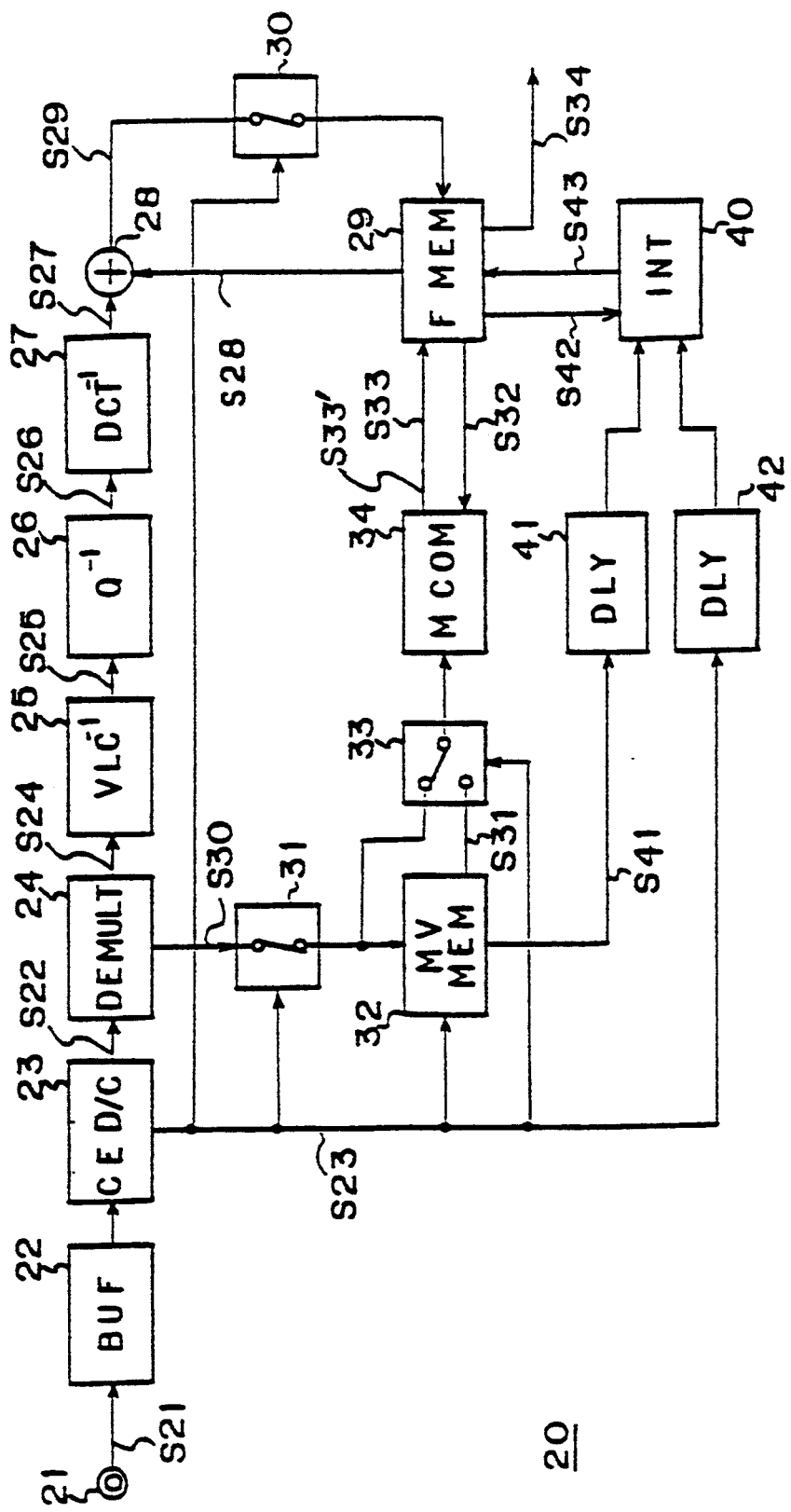
FIG. 3 is a block diagram showing the construction of an embodiment of the compressed motion picture signal expander according to the invention.

FIG. 3 shows the compressed motion picture signal expander apparatus 20 according to the invention for expanding the compressed motion picture signal generated by the motion picture signal compressor shown in FIG. 1. The apparatus 20 receives the compressed motion picture signal S21 reproduced from the recording medium (not shown) via the input terminal 21 and the input buffer 22, whence it is supplied to the error detecting/correcting circuit 23.

The error detecting/correcting circuit 23 detects and corrects errors in the picture signal component of the compressed motion picture signal S21, and supplies the resulting error-corrected picture signal component S22 to the demultiplexer 24.

The error detecting/correcting circuit 23 also supplies the switching signal S23, which activates error concealment when the error detecting/correcting circuit detects a block of the picture signal component including an uncorrectable error.

The demultiplexer circuit 24 separates the motion vectors from the error-corrected picture signal component S22 and supplies the resulting picture signal S24 in blocks to the variable-length decoder circuit 25. The variable-length decoder circuit 25 applies variable-length decoding to the blocks of the picture signal S24 to provide blocks of quantized transform coefficients S25, which are supplied to the inverse quantizer 26.

The inverse quantizer 26 inversely quantizes the blocks of quantized transform coefficients S25 to provide blocks of transform coefficients S26, which are then fed into the inverse discrete cosine transform circuit 27. The inverse discrete cosine transform circuit 27 applies transform processing inverse to that applied by the discrete cosine transform circuit 5 (FIG. 1) to each block of transform coefficients S26. Each recovered difference block S27 is supplied to the adder 28.

The adder 28 adds the recovered difference block S27 to the reference block S28, which is a block of a reference picture read from the frame memory 29, to produce the reconstructed picture block S29. The reconstructed picture block S29 is supplied to the frame memory 29 via the switching circuit 30.

The reconstructed picture block S29 is one block of a new reconstructed picture that is stored in successive blocks in the frame memory 29. Once all the blocks of the new reconstructed picture have been stored in the frame memory 29, blocks of the new reconstructed picture can be read out as reference blocks for use in reconstructing other pictures of the motion picture signal. Moreover, the new reconstructed picture is read out from the frame memory to provide a picture of the motion picture output signal S34.

The switching circuit 30 is controlled by the switching signal S23 from the error detecting/correcting circuit 23. When the error detecting/correcting circuit 23 detects an uncorrectable signal error in the compressed motion picture signal S21, the switching circuit 30 operates to interrupt storage of the resulting defective reconstructed picture block S29 as a block of the new reconstructed picture the frame memory 29.

The demultiplexer circuit 24 separates the motion vector S30 from the S22, and supplies the motion vector via the switching circuit 31 to the motion vector memory 32. Normally, when the error detecting/correcting circuit 23 has not detected an uncorrectable error, the switching circuit 31 supplies the current motion vector S30, i.e., the motion vector for the current block of the current picture, to the motion vector memory 32, which holds the motion vectors for each block of the past three pictures.

The switching circuit 33 is also controlled by the switching signal S23 supplied from the error detecting/correcting circuit 23. Normally, when an uncorrectable error has not been detected in the compressed motion picture signal S21, the switching circuit 33 supplies the current motion vector S30 to the motion compensation circuit 34. However, when an uncorrectable error is detected, the switching circuit 33 supplies the previous motion vector S31 stored in the motion vector memory 32 to the motion compensation circuit 34.

The motion compensation circuit 34 receives the reference picture S32 from the frame memory 29 and reads the reference block from the reference picture using the current or the previous motion vector S30 or S31, depending on the states of the switches 31 and 33. The resulting reference block S33 is stored back in the frame memory 29.

When an uncorrectable signal error is detected, the frame memory 29 temporarily selects a replacement picture block S33' of the reference picture S32 using the previous motion vector S31, and stores the replacement picture block S33' in new reconstructed picture in the frame memory 29 as a replacement for the defective reconstructed picture block. The frame memory also supplies the replacement block S33' generated in response to the previous motion vector S31 as a picture block of the motion picture output signal S34.

When the amount of motion represented by the previous motion vector S31 is larger than a predetermined value, the frame memory 29 substitutes the interpolated picture block S43 for the replacement picture block S33' generated using the previous motion vector as a replacement for the defective reconstructed picture block. The interpolating circuit 40 generates the interpolated picture block S43 by intra-picture interpolation. The frame memory stores the interpolated picture block S43 as a replacement for the defective reconstructed picture block of the new reconstructed picture, and also supplies the interpolated picture block as a picture block of the motion picture output signal S34.

Figure 7:
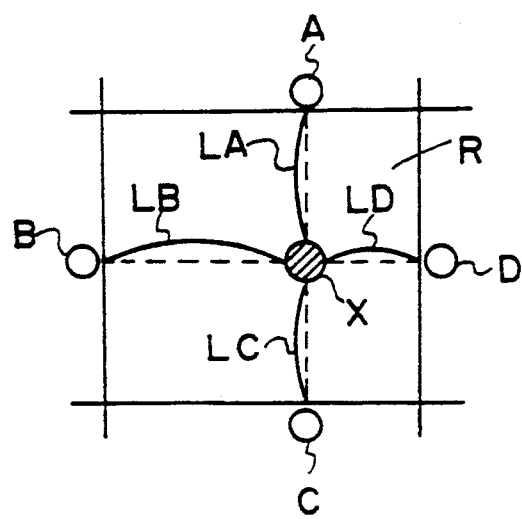
FIG. 7 is a schematic diagram showing block interpolation.

The interpolation circuit 40 receives the motion vector S41 via the delay circuit 41 from the motion vector memory 32, and also receives the switching signal S23 via the delay circuit 42. When the amount of motion represented by the motion vector S41 is larger than a predetermined threshold, the interpolation circuit 40 produces the interpolation picture block S43 calculated from the values S42 of the boundary pixels of the four picture blocks adjacent the defective picture block. For example, the value of the pixel X, indicated by the shaded circle X in FIG. 7, is calculated from the values of the four pixels A, B, C and D, indicated by the unshaded circles in FIG. 7. The values of the boundary pixels are read out from the frame memory 29.

FIG. 7 illustrates the intra-picture interpolation processing, for which, to calculate the pixel value x of the pixel X, the interpolation circuit 40 requires the pixel values (a, b, c, and d) of the four pixels A, B, C and D in the blocks located above, below, to the left, and to the right of the defective picture block R. Therefore, the interpolation processing cannot be carried out until after the picture block located adjacently below the defective picture block R has been reconstructed. However, if the defective picture block R is located in the lowermost slice of the picture, the interpolation circuit 40 starts the intra-picture interpolation processing immediately after the inter-picture prediction processing has been completed by the motion compensating circuit 34.

The delay circuits 41 and 42 delay the motion vector S41 and the switching signal S23 to enable the picture block preceding the current picture block by one slice to be corrected.

The compressed motion picture signal expander apparatus 20 described above sequentially receives the compressed motion picture signal S21 reproduced from the recording medium, and feeds this signal via the input buffer circuit 22 to the error detecting/correcting circuit 23.

The error detecting/correcting circuit 23 corrects errors in the compressed motion picture signal using the error detecting and correcting code embedded in the compressed motion picture signal. The error/detecting correcting circuit feeds the resulting error-corrected picture signal component S22 via the demultiplexer circuit 24, the variable-length decoding circuit 25, and the inverse quantizer 26, to the inverse discrete cosine transform circuit 27. The inverse discrete cosine transform circuit feeds the recovered difference block to the adder 28.

The adder 28 produces reconstructed picture blocks S29 by adding the recovered difference block S27 to the reference block S28. The reference block is generated by applying motion compensation to the I-picture I0 stored in the frame memory 29 as a reference picture. The adder supplies the reconstructed picture block via the switching circuit 30 to the frame memory 29. The P-picture P0 and the B-pictures B0, B1, . . . are sequentially reconstructed by expanding the compressed motion picture signal and are stored in the picture memory 29. These pictures are also read out of the frame memory to provide pictures of the motion picture output signal S34 (FIG. 4).

When the error detecting/correcting circuit 23 detects in the reproduced compressed motion picture signal S21 a signal portion that includes an uncorrectable signal error, the error detecting/correcting circuit 23 supplies the switching signal S23 to the switching circuits 30 and 31, and interrupts the writing of the defective reconstructed picture block S29 and the defective motion vector S30 into the frame memory 29 and the motion vector memory 32, respectively.

The error detecting and correcting circuit S23 additionally supplies the switching signal S23 to the vector memory 32 and to the switching circuit 33. This causes the motion vector of the picture block of the previous picture S31 corresponding to the defective picture block to be supplied via the switching circuit 33 from the motion vector memory 32, where it is stored, to the motion compensation circuit 34 in lieu of the defective motion vector S30. The motion compensation circuit 34 applies motion compensation to the reference picture using to the motion vector of the previous picture to provide the replacement picture block S33' to replace the defective reconstructed picture block derived from the signal portion including the uncorrectable error.

Figure 4:
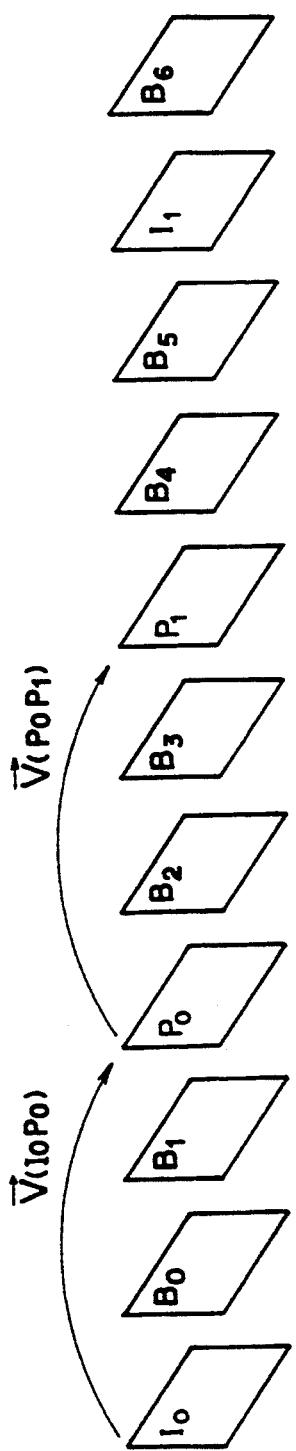
FIG. 4 is a schematic diagram showing inter-frame motion prediction when a block including an uncorrectable error is detected in the intra-frame coded picture I1.
Figure 5:
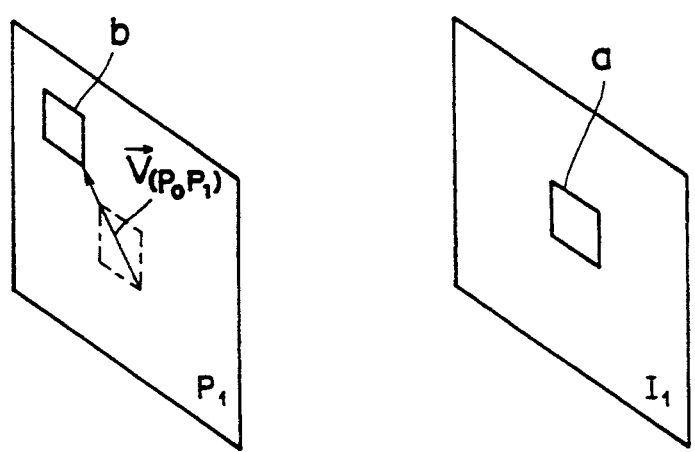
FIG. 5 is a schematic diagram showing motion compensation by a motion vector.

When the error detecting/correction circuit 23 detects an uncorrectable signal error in the porion of the compressed motion picture signal representing the I-picture I1, shown in FIG. 4, at least the motion vector V (P0P1) between the first and second P-pictures P0 and P1 stored in the motion vector memory 32 is used to produce the replacement picture block S33' of the I-picture I1 from the second P-picture P1 by inter-picture prediction.

The frame memory 29 replaces the defective picture block resulting from the signal portion including the uncorrectable signal error with the replacement picture block S33' produced by the motion compensation circuit 34, and supplies the replacement picture block a picture block of the motion picture output signal S34.

This effectively avoids deterioration of the quantity of the resulting reproduced picture, and prevents the results of the uncorrectable signal error from propagating to other pictures, as occurs in prior art decoders when an uncorrected error is present in an I-picture.

Similarly, in the compressed motion picture signal expander 20, when the uncorrectable error is detected in the portion of the compressed motion picture signal representing the second P-picture P1, the replacement block is generated using the motion vector V (I0P0) between the I-picture I0 and the first P-picture P0 and, using that motion vector, carrying out inter-picture prediction of the replacement block S33' of the second P-picture P1 from the first P-picture P0.

Figure 6:
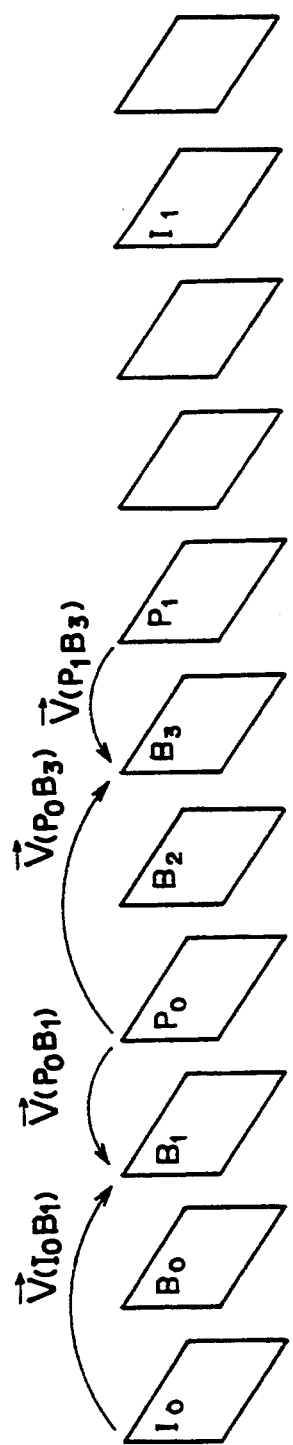
FIG. 6 is a schematic diagram showing inter-frame motion prediction when a block including an uncorrectable error is detected in the intra-frame coded picture I1.

Further, as shown in FIG. 6, in the compressed motion picture signal expander 20, when the uncorrectable code error is detected in the portion of the compressed motion pictures signal representing the fourth B-picture B3 predicted from both the first and second P-pictures P0 and P1, the motion vector V (I0B1) between the first I-picture I0 and the second B-picture B1, and the motion vector V (P0B1) between the first P-picture P0 and the second B-picture B1 are used to predict the replacement picture block S33' for the fourth B-picture B3 from both the first and second P-pictures P0 and P1.

However, when the amount of motion represented by the motion vector is large, it is possible to substitute intra-picture interpolation processing for the above-described inter-picture prediction processing as follows: the interpolation circuit 40 determines whether or not the amount of motion represented by the motion vector S41 supplied via the delay circuit 41 is larger than a predetermined value. If the amount of motion is smaller than the predetermined value, the frame memory 29 supplies a picture block, as a picture block of the motion picture output signal S34, which is subject to the inter-picture interpolation in which, for example, the pixel value x of the pixel X in the defective block is replaced by the corresponding pixel value of the replacement picture block S33'.

On the other hand, when the amount of motion is larger than the predetermined value, the interpolation circuit 40 produces the pixel value of each pixel in the defective picture block from the values of the boundary pixels of the four blocks surrounding the defective picture block. For example, interpolation circuit 40 derives the value of the pixel X from the values of the four pixels (A, B, C and D) in the picture blocks adjacent the defective picture block R resulting from the signal portion that includes the uncorrectable signal error. The interpolation circuit supplies the block of interpolated pixel values as the interpolated replacement picture block S43.

As shown in FIG. 7, the four pixels indicated by the unshaded circles A, B, C and D on the boundary of the picture blocks adjacent the defective picture block R are the pixels that are located in the same column and row of the respective adjacent blocks as the pixel indicated by the shaded circle X in the picture block R. The pixels A, B, C, and D have pixel values of a, b, c, and d, respectively.

Assuming that distances between the four pixels A, B, C and D and the pixel X are LA, LB, LC and LD, respectively, the pixel value x of the pixel X can be obtained by the linear interpolation as expressed by the following formula:
The pixel value x is supplied to the frame memory 29 as the interpolated value of the pixel X in the interpolated replacement block S43. The process is repeated for all the other pixels in the interpolated replacement block S43.

The frame memory 29 stores the interpolated replacement block S43 as a replacement for the defective picture block, instead of the replacement picture block S33', and supplies it as a picture block of the motion picture output signal S34.

When the defective picture block R is in the outermost slice or column of the picture, or when one of the picture blocks adjacent the picture block R has also been derived from a portion of the compressed motion picture signal that includes an uncorrectable signal error, all four pixels A, B, C and D in the adjacent blocks cannot be used for interpolating the interpolated replacement block S43. In this case, the pixel value x is obtained using the pixel of the adjacent block opposite to the unusable adjacent block.

For example, in FIG. 7, if the adjacent block to the left of the defective block cannot be used for interpolation, and thus the pixel value b of the pixel B cannot be obtained, $$b = d \qquad (2)$$

is substituted in the formula (1) to obtain the value x of pixel X.

When it is impossible to use adjacent picture blocks located both to the left and to the right of the defective picture block R, formula (3) is used to calculated the value x of the pixel X using only the pixel values a and c of the pixels A and C located in the blocks above and below the defective block.

Figure 8:
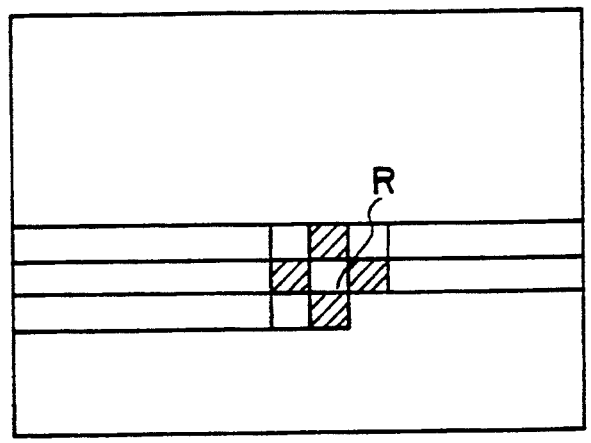
FIG. 8 is a schematic diagram showing intra-frame interpolating processing.

This interpolation processing provides error concealment that renders the replacement for the defective picture block unnoticeable relative to the adjacent picture. These positional relation of blocks R and A to D is shown in FIG. 8.

The compressed motion picture signal expander described above operates as follows to provide a motion picture output signal by expanding a compressed motion picture signal in units of blocks. When an uncorrectable signal error is detected in the compressed motion picture signal, the resulting defective reconstructed picture block is temporarily replaced with a replacement picture block. The replacement picture block is produced by prediction from a past picture using the motion vector of the past picture. Further, if the motion vector of the past picture represents a large quantity of motion, the defective reconstructed picture block is replaced by an interpolated replacement picture block. The interpolated replacement block is generated by interpolation using the boundary pixels of the picture blocks adjacent the defective picture block. In this manner, the defective picture block can be replaced so as to render the effect of the uncorrectable signal error unnoticeable, regardless of the amount of motion of the defective picture block.

In the embodiment described above, the picture is predicted in units of pictures, which can be frames or fields.

Further, in the embodiment described above, the invention is applied to a system utilizing a discrete cosine transform (DCT) and inter-picture motion prediction. However, the invention is not limited to the above case, and may be applied to a compressed motion picture signal expander executing prediction processing between frames.

Further, in the embodiment described above, inter-picture prediction of the replacement picture block to replace the defective picture block derived from to the signal portion including the uncorrectable signal error is carried out by performing motion compensation using the motion vector of the picture block of the past picture corresponding to the defective picture block. However, the invention is not limited to this, and may be applied to the case in which the replacement is carried out using the pixel data of the picture block of the past picture corresponding to the defective picture block.

Figure 9:
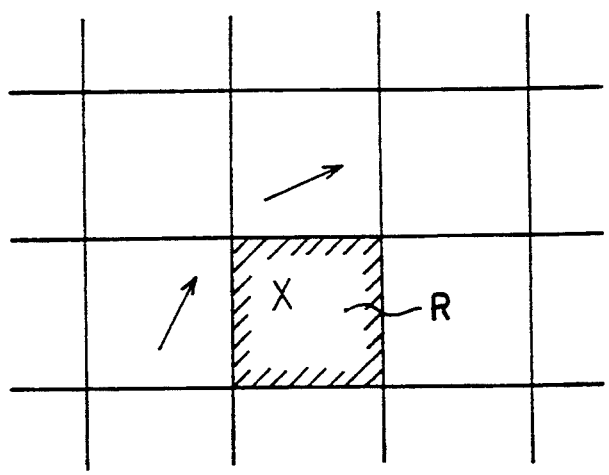
FIG. 9 is a schematic diagram showing another embodiment.

Further, in the embodiment described above, when an uncorrectable signal error occurs, an intra-picture interpolation replacement picture block is generated, or an inter-picture replacement picture block is generated using the motion vector of the past picture. However, the invention is not limited to the above case, and the replacement picture block may be derived from the past picture by prediction using the motion vector of an adjacent picture block in the current picture. For example, FIG. 9 shows the motion vectors of adjacent picture blocks that have been reconstructed and are located to the left and above the missing block R.

Further, in the embodiment described above, if it is impossible to use the picture blocks adjacently located to the left and to the right of the defective picture block R for interpolation, the pixel value x of the pixel X is obtained using the formula (3). However, the invention is not limited to this case. If it is impossible to use the adjacent picture blocks located above and below the defective block R for interpolation, the pixel value x of the pixel X can be obtained in a similar manner.

Further, in the embodiment described above utilizes the sequence shown in FIG. 2, i.e., sequence of I0, B0, B1, P0, B2, B0, P1, B4, B5, I1, . . . However, the invention is not limited to this, and may be applied to different sequences of combinations of intra-picture coded pictures (I-pictures), forward predictively-coded pictures (P-pictures), and bidirectional predictively-coded pictures (B-pictures).

Further, in the embodiment described hereinabove, the motion vectors for the last three pictures are stored in the motion vector memory 32. However, the invention is not limited to this, and may be applied to various cases in which the motion vectors of multiple past pictures are stored.

Furthermore, the embodiment has been described with respect to the case in which the uncorrectable signal error occurs in a single picture. However, the invention may also be applied to the case in which uncorrectable signal errors occur continuously.

For example, if the uncorrectable signal errors occur in the P-picture P1 and in the I-picture I1, the motion vector V (I0P0) between the I-picture I0 and the P-picture P0 can be used to derive the replacement picture block.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A compressed motion picture signal expander for expanding a compressed motion picture signal to provide a motion picture output signal, the compressed motion picture signal comprising a sequence of signal portions, each signal portion representing part of a picture and including a motion vector, the apparatus comprising:
   error correcting means for correcting errors in the compressed motion picture signal, and for supplying an error detection signal when an uncorrectable error is detected in a signal portion; and
   decoding means for decoding said each signal portion of the compressed motion picture signal using a previously-decoded picture and the motion vector of the signal portion to provide a portion of the motion picture output signal, the decoding means providing a portion of the motion picture output signal using the previously-decoded picture and a previous motion vector used by the decoding means to decode the previously-decoded picture when the error detection signal indicates an uncorrectable error is detected in said signal portion.

2. The compressed motion picture signal expander according to claim 1, wherein:
   the compressed motion picture signal includes signal portions representing a current picture, the current picture being one of an intra-coded picture and a predictively-coded picture; and
   when the error detection signal indicates that an uncorrectable error is detected in a signal portion representing the current picture, the decoding means provides the portion of the motion picture output signal using the previously-decoded picture, the previously-decoded picture being a picture decoded by the decoding means immediately before the current picture, and the previous motion vector used by the decoding means to decode the previously-decoded picture.

3. The compressed motion picture signal expander according to claim 1, wherein:
   the compressed motion picture signal includes signal portions representing a current picture, the current picture being a bidirectional predictively-coded picture; and
   when the error detection signal indicates that an uncorrectable error is detected in one of the signal portions representing the current picture, the decoding means provides the portion of the motion picture output signal using the previously-decoded picture, an additional previously-decoded picture, and the previous motion vector, the previously-decoded picture being one of an predictively-coded picture and an intra-coded picture, the additional previously-decoded picture being a predictively-coded picture, the previously-decoded picture and the additional previously-decoded picture being decoded by the decoding means before the current picture, the previous motion vector being a motion vector used by the decoding means to decode a bidirectional predictively coded picture decoded before the current picture.

4. The compressed motion picture signal expander according to claim 1, 2, or 3, additionally comprising means for reading the compressed motion picture signal from an optical disc.

5. A compressed motion picture signal expander for expanding a compressed motion picture signal to provide a motion picture output signal, the compressed motion picture signal comprising a sequence of signal portions, each signal portion representing part of a picture and including a motion vector, the apparatus comprising:
   error correcting means for correcting errors in the compressed motion picture signal, and for supplying an error detection signal when an uncorrectable error is detected in a signal portion; and
   decoding means for decoding said each signal portion of the compressed motion picture signal using a previously-decoded picture and the motion vector of the signal portion to provide a portion of the motion picture output signal, the decoding means providing one of a predictive picture signal and an interpolated picture signal as the portion of the motion picture output signal when the error detection signal indicates an uncorrectable error is detected in said signal portion.

6. The compressed motion picture signal expander according to claim 5, wherein the decoding means includes means for generating the predictive picture signal using the previously-decoded picture and a previous motion vector used by the decoding means to decode the previously-decoded picture.

7. The compressed motion picture signal expander according to claim 6, wherein the decoding means provides the interpolated picture signal as the portion of the motion picture output signal when the error detection signal indicates an uncorrectable error is detected in the signal portion and the previous motion vector represents a motion quantity greater than a predetermined value.

8. The compressed motion picture signal expander according to claim 5 or 6, wherein:
   said each signal portion represents a block of a picture; and
   the decoding means includes means for generating the interpolated picture signal by interpolation using decoded blocks adjacent the block represented by the signal portion wherein the error detection signal indicates an uncorrectable error is detected.

9. The compressed motion picture signal expander according to claim 5 or 6, additionally comprising means for reading the compressed motion picture signal from an optical disc.

10. The compressed motion picture signal expander according to claim 5, wherein:

said each signal portion represents a block of a picture; and the decoding means provides the interpolated picture signal as the portion of the motion picture output signal when the error detection signal indicates an uncorrectable error is detected in the signal portion and an adjacent block motion vector represents a motion quantity greater than a predetermined value, the adjacent block motion vector being the motion vector of a signal portion representing a block adjacent the block represented by the signal portion wherein the error detection signal indicates an uncorrectable error is detected.

* * * * *